United States Patent [19]

Rosaen

[11] Patent Number: 4,535,797
[45] Date of Patent: Aug. 20, 1985

[54] AUTOMATIC SHUT OFF VALVE

[76] Inventor: Nils O. Rosaen, Norco Products, Inc., 2139 Heide, Troy, Mich. 48084

[21] Appl. No.: 523,926

[22] Filed: Aug. 17, 1983

[51] Int. Cl.³ .............................................. F16K 17/10
[52] U.S. Cl. ..................... 137/87; 137/110; 137/459; 137/462; 137/556.3
[58] Field of Search ................. 137/87, 110, 459, 462, 137/556.3

[56] References Cited

U.S. PATENT DOCUMENTS

| | | | |
|---|---|---|---|
| 1,588,275 | 6/1926 | Schutte | 137/87 X |
| 2,744,533 | 5/1956 | Parker | 137/87 |
| 3,153,424 | 10/1964 | Acker | 137/505.41 |
| 3,230,971 | 1/1966 | Rosaen | 137/556.3 |
| 3,336,941 | 8/1967 | English | 137/556.3 X |
| 4,446,890 | 5/1984 | Simpson | 137/87 |

FOREIGN PATENT DOCUMENTS

| | | | |
|---|---|---|---|
| 685645 | 12/1939 | Fed. Rep. of Germany | 137/87 |
| 1803360 | 10/1968 | Fed. Rep. of Germany | 137/87 |

Primary Examiner—Harold W. Weakley
Attorney, Agent, or Firm—Gifford, VanOphem, Sheridan, Sprinkle & Nabozny

[57] ABSTRACT

An automatic shut off valve comprising a housing having a main inlet, an outlet, a user inlet and a user outlet. A valve assembly is contained within the housing and is movable between an open and a closed position. In its open position, the user inlet and outlet are fluidly connected in series with the main inlet and main outlet while, conversely, in its closed position, the valve assembly sealingly closes and isolates both the user inlet and outlet from the main inlet and main outlet. A compression spring urges the valve assembly towards its closed position while a fluid flow rate greater than a predetermined amount into the user inlet retains the valve assembly in its open position. Consequently, in the event of an interruption or blockage of the fluid flow between the user inlet and outlet, the compression spring snaps the valve assembly to its closed position thus isolating the inlet and outlet from the main inlet and terminating fluid flow through the shut off valve. In the preferred form of the invention, a flow indicator provides an exteriorly visible indication of the flow rate through the shut off valve.

6 Claims, 4 Drawing Figures

AUTOMATIC SHUT OFF VALVE

BACKGROUND OF THE INVENTION

I. Field of the Invention

The present invention relates generally to valves and, more particularly, to an automatic shut off valve responsive to fluid flow rate through a portion of the valve.

II. Description of the Prior Art

There are a number of previously known shut off valves which are responsive to a line condition, for example the fluid pressure or fluid flow rate, which automatically close in the event of a particular line condition. These previously known devices, however, have been generally bulky and expensive in construction and not wholly effective in operation.

SUMMARY OF THE PRESENT INVENTION

The present invention provides an automatic shut off valve which overcomes the above-mentioned disadvantages of the previously known devices.

In brief, the automatic shut off valve according to the present invention comprises a housing having a main inlet, a main outlet, a user inlet and a user outlet. A first fluid passageway is formed through the housing for fluidly connecting the main inlet to the user inlet and, similarly, a second fluid passageway fluidly connects the user outlets to the main outlet. A fluid handling device, such as a cooler, is fluidly connected in series between the user inlet and outlet.

A valve assembly is contained within the housing and movable between an open and a closed position. In its closed position, the valve assembly closes both the first and second fluid passageways thus isolating the user inlet and outlet from the main inlet and outlet and simultaneously blocking fluid flow into the main inlet. Conversely, in its open position, the valve assembly establishes fluid communication to both the first and second passageways. Thus, in its open position, fluid flows into the main inlet, to the user inlet, returns to the user outlet and thereafter exits from the main outlet.

The valve assembly is urged towards its closed position by a compression spring but a fluid flow greater than a predetermined amount into the housing from the user inlet engages a reaction surface on the valve assembly and retains the valve assembly in its open position. Thus, in the event of a line break or excessive line clogging between the user inlet and outlet, the fluid flow rate into the housing from the user inlet falls below the predetermined flow rate whereupon the compression spring automatically moves the valve assembly to its closed position. In doing so, the user inlet and outlet are isolated from the main inlet and outlet and, simultaneously, the valve assembly blocks further fluid flow into the main inlet.

In the preferred form of the invention, a flow indicator is mechanically coupled to the valve assembly and provides an exteriorly visible signal of the fluid flow rate through the automatic shut off valve.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
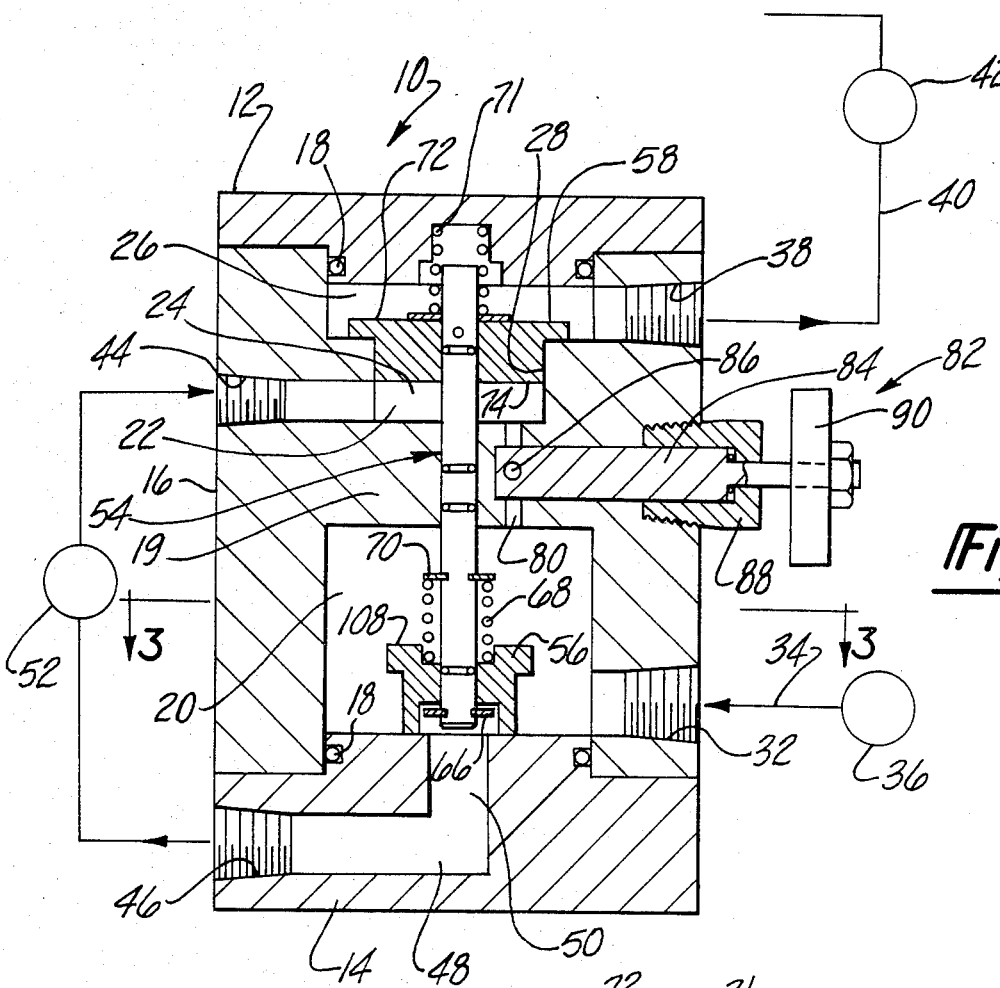
FIG. 1 is a longitudinal sectional view illustrating a preferred embodiment of the automatic shut off valve of the present invention and with the valve in its closed position.

With reference first to FIG. 1, a preferred embodiment of the automatic shut off valve of the present invention is threshown and comprises a housing 10 having a top wall 12, a bottom wall 14 and a tubular cylindrical side wall 16. The top wall 12 and bottom wall 14 are secured to opposite ends of the side wall 16 in any conventional fashion and seal members 18 are provided between the top and bottom walls 12 and 14 and the side walls 16.

A transversely extending housing partition 19 divides the housing into a first or lower housing chamber 20 and a second or upper housing chamber 22. The upper housing chamber 22 further includes a lower portion 24 and an upper portion 26 which are fluidly connected together by an axially extending port 28 formed in the housing.

A main inlet 32 is formed in the housing side wall 16 and open to the lower housing chamber 20. This main inlet 32 is fluidly connected by a line 34 to a pressurized source 36 of fluid. Similarly, a main outlet 38 is also formed in the housing side wall 16 and open to the upper portion 26 of the upper housing chamber 22. The main outlet 38 is connected by a fluid line 40 to a low pressure fluid source 42, such as a reservoir.

Still referring to FIG. 1, a user inlet 44 is formed in the housing side wall 16 and open to the lower portion 24 of the upper housing chamber 22. A user outlet 46 is formed in the housing bottom wall 14 and fluidly connected by a passageway 48 via an axially extending portion 50 to the lower housing chamber 20. A fluid handling device 52, such as a cooler, is fluidly connected in series between the user outlet 46 and user inlet 44.

Figure 2:
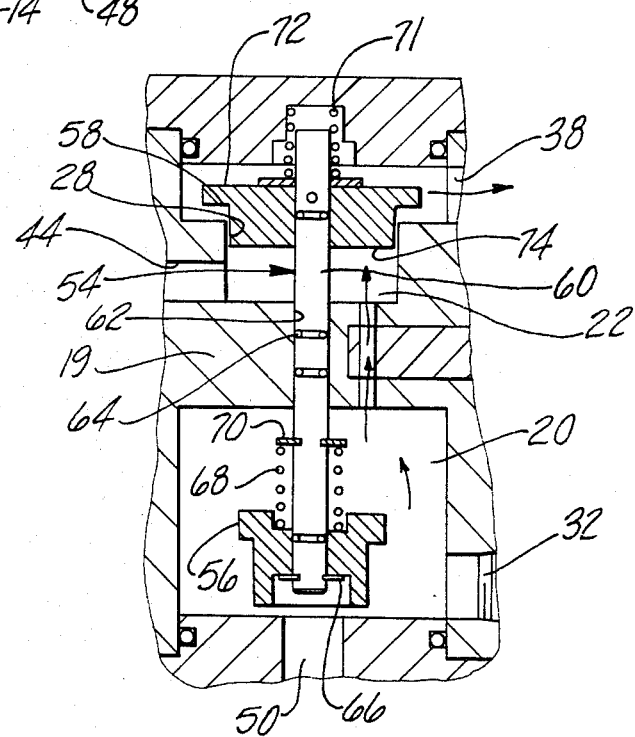
FIG. 2 is a sectional view similar to FIG. 1 but illustrating the bypass valve in its open position.

With reference now particularly to FIG. 2, a valve assembly 54 includes a first valve member 56 and a second valve member 58 which are axially aligned with each other and carried by a valve stem 60. The valve stem 60 is axially slidably mounted through a bore 62 formed in the housing partition 19 while fluid seals 64 around the valve stem 60 prevent fluid leakage along the housing bore 62.

Still referring to FIG. 1, the first valve member 56 is axially slidably mounted to the valve stem 60 while a retainer clip 66 limits the downwardmost position of the first valve member 56 with respect to the stem 60. A compression spring 68 is entrapped between a retainer clip 70 on the stem 60 and the top of the first valve 56 thus urging the first valve member 56 toward the lower retainer clip 66 for a reason to be subsequently described.

Still referring to FIG. 2, the upper valve member 58 is secured to the upper end of the valve stem 60 in any conventional fashion. The upper or second valve member 58 includes a lower cylindrical portion which fits within and sealingly engages the port 28. An upper enlarged diameter portion 72 of the second valve 58 abuts against the housing 10 around the port 28 to limit the downward movement of the second valve member 58 and thus of the valve stem 60.

The valve assembly 54 is movable between an open position, illustrated in FIG. 2 and a closed position, illustrated in FIG. 1 and a compression spring urges the valve assembly 54 towards its closed position. In its closed position, the first valve member 56 covers the axially extending portion 50 of the passageway 48 and thus prevents any fluid flow from the lower housing chamber 20 and to the passageway 48. Simultaneously, the second valve member 58 closes the housing port 28 and thus prevents fluid flow between the lower and upper portions 24 and 26 of the upper housing chamber 22. Consequently, with the valve assembly 54 in its closed position, the user inlet 44 and outlet 46 are fluidly isolated from the main inlet 32 and main outlet 38 and the first valve member 56 blocks further fluid flow into the housing chamber 20 from the main inlet 32. In addition, the compression spring 68 ensures positive seating of the first valve member 56 against the housing bottom wall 14 thus positively closing the fluid passageway 48.

Conversely, with the valve in its open position, as shown in FIG. 2, the valve assembly 54 shifts upwardly against the force of the compression spring 71. In doing so, the first valve member 56 opens the fluid passageway 48 to the housing chamber thus permitting fluid flow from the main inlet 32 and to the user outlet 46. Simultaneously, the second valve member 58 uncovers the housing port 28 and establishes fluid flow from the user inlet 44, through the upper housing chamber 22 through the port 28 and to the main outlet 38.

Assuming that the fluid flow through the fluid handling device 52 is greater than a predetermined amount, the fluid flow into the user inlet 44 impinges upon a bottom surface 74 of the second valve member 58 and retains the valve assembly 54 in its open position against the force of the spring 71. Consequently, the bottom surface 74 of the second valve member 58 forms a reaction surface which is responsive to the flow rate into the housing from the user inlet 44. Consequently, if the fluid flow through the fluid handling device 52 is interrupted or falls below a predetermined level, as could occur by excessive clogging of the fluid handling device, the compression spring 71 forces the valve assembly 54 to its closed position (FIG. 1) thus isolating the user inlet 44 and outlet 46 from the main inlet 32 and main outlet 38 and simultaneously preventing further fluid flow from the pressurized fluid source 36 and into the lower housing chamber 20.

With reference now particularly to FIG. 2, since the valve assembly 54 is normally urged to its closed position by the compression spring 71, it is necessary to move the valve member assembly 54 to its open position in order to initiate operation of the automatic shut off valve. In the preferred form of the invention, the means for initially moving the valve assembly to its open position comprises a restricted bypass port 80 formed in the housing partition 19 and extending between the lower housing chamber 20 and the lower portion 24 of the upper housing chamber 22. A bypass valve assembly 82 having a valve stem 84 with a diametrically extending throughbore 86 is rotatably mounted to the housing side wall 16 by a packing assembly 88. The valve stem 84 is manually rotatable by a handle 90 between an open position, in which the diametric bore 86 registers with the passageway 80, to a closed position in which the diametric bore 86 is not aligned with the passageway 80.

In order to initiate operation of the automatic shut off valve, the bypass valve assembly 82 is first rotated to its open position whereupon pressurized fluid from the lower housing chamber 20 passes through the passageway 80 and into the lower portion 24 of the upper housing chamber 22. Continued fluid flow from the pressurized fluid source 36 and to the lower portion 24 of the upper housing chamber 22 shifts the valve assembly 54 upwardly against the force of the compression spring 71 thus moving the valve assembly to its open position. In doing so, fluid flow is established through the fluid handling device 52 in the desired fashion. Once the valve assembly has been moved to its open position, the bypass valve assembly 82 is moved to its closed position and the continued fluid flow through the fluid handling device 52 maintains the valve assembly 54 in its open position in the previously described fashion.

It will be understood, of course, that other means may alternatively be employed to initially move the valve assembly 54 to its open position without deviation from the spirit or scope of the invention. For example, a plunger or other device could be alternatively employed to mechanically move the valve assembly to its open position in order to initiate fluid flow through the automatic shut off valve.

Figure 3:
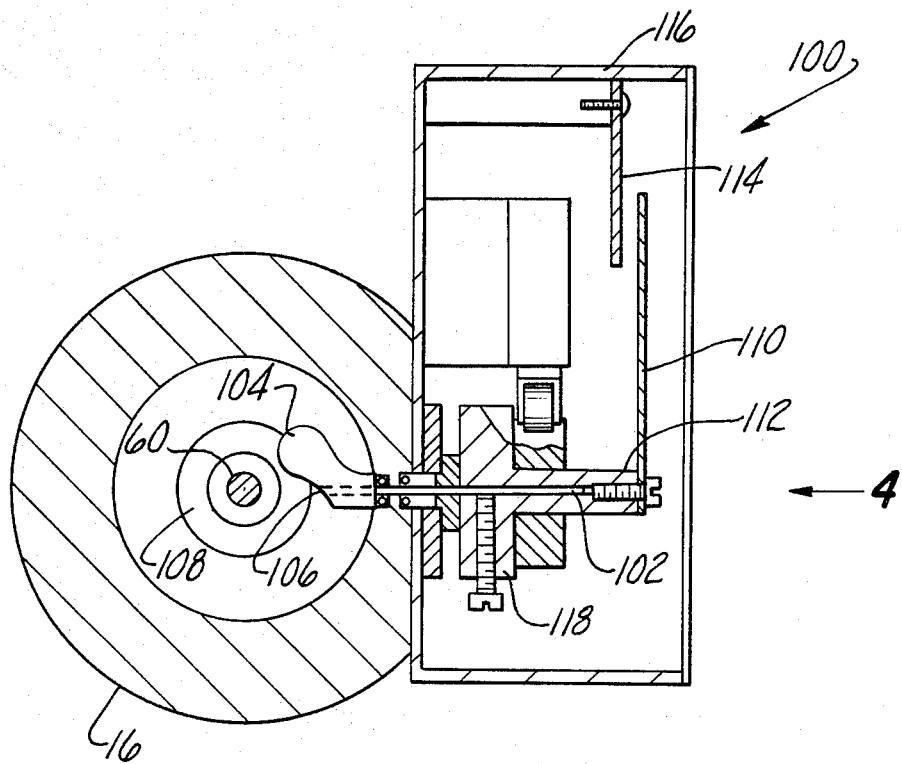
FIG. 3 is a view taken substantially along line 3—3 in FIG. 1 and with parts removed for clarity.
Figure 4:
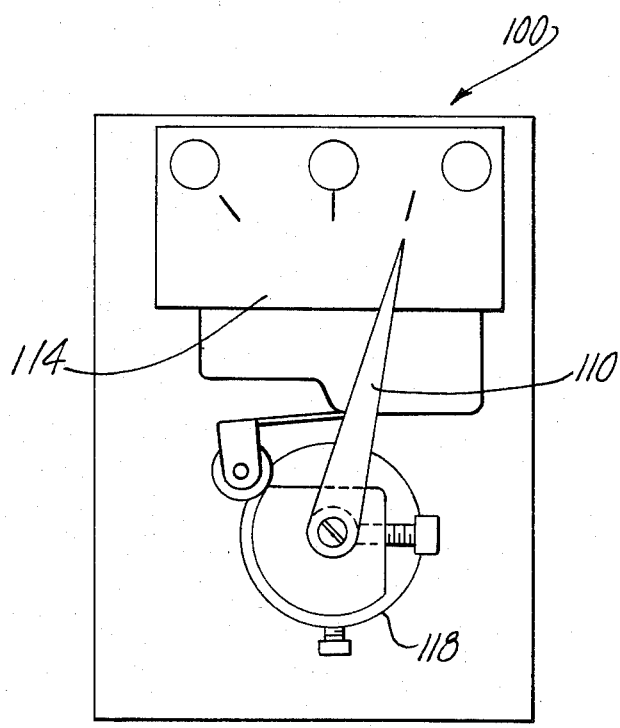
FIG. 4 is a view taken substantially along arrow 4 in FIG. 3 and with parts removed for clarity.

With reference now to FIGS. 3 and 4, in the preferred form of the invention, the automatic shut off valve includes means 100 for indicating the fluid flow rate through the shut off valve. The indicator means 100 comprises a shaft 102 rotatably mounted to and extending generally radially outwardly from the housing 10. A radially outwardly extending lever 104 secured to one end 106 of the shaft 102 and abuts against the top surface 108 of the first valve member 56. Thus, upward movement of the valve assembly 54 and thus of the first valve member 56, rotates the shaft 102 via the lever 104.

Still referring to FIGS. 3 and 4, an indicator needle 110 is secured to the other end 112 of the shaft 102 so that the indicator needle 110 extends generally radially with respect to the axis of the shaft 102. The free end of the needle 110 cooperates with an indicia plate 114 secured to an indicator housing 116 so that the position of the indicator needle 110 with respect to the indicia plate 114 is indicative of the rotational position of the shaft 102 and thus indicative of the position of the valve assembly 54. In addition, a biasing assembly 118 resiliently urges the level 104 against the top surface 108 of the first valve member 56.

Assuming that the valve assembly 54 is in its open position and that fluid flow is established through the fluid handling device, an increase of the fluid flow rate through the automatic shut off valve urges the valve assembly 54 to a more upwardly spaced position in order to accommodate the increased fluid flow. This upward movement of the valve assembly 54 is transmitted through the lever 104 and shaft 102 to the indicator needle 110 thus indicating an increased fluid flow on the indicia plate 114. Conversely, a reduction in the fluid flow rate through the handling device 52 allows the valve assembly to shift downwardly somewhat from the force of the compression spring 71 thus rotating the shaft 102 via the lever 104 in the opposite direction. The needle 110 rotates to indicate a reduced fluid flow rate through the fluid handling device 52 and thus through the automatic shut off valve.

From the foregoing, it can be seen that the device of the present invention provides an automatic shut off valve either alone or in combination with an indicator means which is both simple and inexpensive in construction and yet wholly effective in operation.

Having described my invention, however, many modifications thereto will become apparent to those skilled in the art to which it pertains without deviation from the spirit of the invention as defined by the scope of the appended claims.

I claim:

1. An automatic shut off valve comprising:

a housing having a main inlet, a main outlet, a user inlet and a user outlet, first fluid passage means for fluidly connecting said main inlet to said user outlet, said first fluid passage means having a first port at a midpoint, second fluid passage means for fluidly connecting said user inlet to said main outlet, said second fluid passage means having a second port at a midpoint, said first and second ports being coaxial and axially spaced from each other, valve means movable between an open and closed position for simultaneously opening and closing said ports in first and second fluid passage means, said valve means comprising an elongated valve stem extending axially between said ports and axially slidably mounted to said housing, a first valve member attached at one end of the valve stem for closing said first port when said valve means is in said closed position, and a second valve member attached at the other end of said valve stem for closing said second port when said valve means is in said closed position, means for resiliently urging said valve means towards its closed position, means for moving said valve means to its open position, and means responsive to a fluid flow rate through said second fluid passage means greater than a predetermined amount for retaining said valve means in said open position.

2. The invention as defined in claim 1 wherein said moving means comprises means for selectively fluidly connecting said main inlet to said user inlet.

3. The invention as defined in claim 1 wherein said moving means comprises a normally closed bypass valve fluidly connected between said main inlet and said user inlet and means assessible exteriorly of said housing for opening said bypass valve.

4. The invention as defined in claim 1 and comprising means for slidably mounting said first valve member to said stem and resilient means for urging said first valve member with respect to said stem towards its closed position.

5. The invention as defined in claim 1 wherein said retaining means comprises a flow reaction surface on said second valve member.

6. The shut off valve as defined in claim 1 and including means disposed exteriorly of said housing and operable to indicate the position of said valve means to indicate the rate of fluid flow through said shut off valve.

* * * * *